(12) United States Patent
Kim et al.

(10) Patent No.: US 10,333,136 B2
(45) Date of Patent: Jun. 25, 2019

(54) METHOD FOR MANUFACTURING ELECTRODE

(71) Applicant: LG CHEM, LTD., Seoul (KR)

(72) Inventors: Dae-Soo Kim, Daejeon (KR); Jin-Ho Yang, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 15/774,926

(22) PCT Filed: Sep. 5, 2017

(86) PCT No.: PCT/KR2017/009717
§ 371 (c)(1),
(2) Date: May 9, 2018

(87) PCT Pub. No.: WO2018/052213
PCT Pub. Date: Mar. 22, 2018

(65) Prior Publication Data
US 2018/0351162 A1 Dec. 6, 2018

(30) Foreign Application Priority Data

Sep. 13, 2016 (KR) .................. 10-2016-0118087
Sep. 4, 2017 (KR) .................. 10-2017-0112722

(51) Int. Cl.
*H01M 4/04* (2006.01)
*H01M 4/139* (2010.01)
(Continued)

(52) U.S. Cl.
CPC ......... *H01M 4/139* (2013.01); *H01M 4/0404* (2013.01); *H01M 4/0435* (2013.01);
(Continued)

(58) Field of Classification Search
CPC ............ H01M 4/0404; H01M 4/0435; H01M 4/0471; H01M 4/139
(Continued)

(56) References Cited

U.S. PATENT DOCUMENTS 5,584,893 A * 12/1996 Mitchell ................ H01M 4/04
29/623.5
6,432,579 B1 8/2002 Tsuji et al.
(Continued)

FOREIGN PATENT DOCUMENTS

EP 2 908 364 A1 8/2015
JP 2000-340216 A 12/2000
(Continued)

OTHER PUBLICATIONS

International Search Report for PCT/KR2017/009717 dated Jan. 12, 2018.

*Primary Examiner* — Brian K Talbot
(74) *Attorney, Agent, or Firm* — Birch, Stewart, Kolasch & Birch, LLP

(57) ABSTRACT

The present disclosure is intended to solve non-uniform distribution of a polymer binder in an electrode active material layer and to improve the adhesion between an electrode current collector and an electrode active material layer. The present disclosure provides a method for manufacturing an electrode which includes the steps of: (S1) applying electrode slurry containing an electrode active material, a polymer binder and a conductive material dispersed in a solvent to one surface of an electrode current collector; (S2) stacking a polymer film onto the top surface coated with the electrode slurry; (S3) drying the electrode current collector having the polymer film stacked thereon to allow evaporation of the solvent; and (S4) rolling the
(Continued)

electrode current collector having the polymer film stacked thereon to obtain an electrode.

5 Claims, 2 Drawing Sheets

(51) Int. Cl.
    *H01M 4/1393*      (2010.01)
    *H01M 4/02*      (2006.01)

(52) U.S. Cl.
    CPC ........ H01M 4/0471 (2013.01); *H01M 4/1393* (2013.01); *H01M 2004/027* (2013.01)

(58) Field of Classification Search
    USPC ................................. 427/58, 115, 359, 372.2
    See application file for complete search history.

(56) References Cited

U.S. PATENT DOCUMENTS

| | | | |
|---|---|---|---|
| 8,951,669 B2* | 2/2015 | Lee | H01M 4/13 429/211 |
| 9,793,535 B2* | 10/2017 | Yu | H01M 4/139 |
| 2009/0186251 A1* | 7/2009 | Budinski | H01M 4/8814 429/414 |
| 2009/0226636 A1* | 9/2009 | Leblanc | H01M 4/0404 427/557 |
| 2011/0159362 A1* | 6/2011 | Wakizaki | H01G 9/02 429/209 |
| 2012/0141877 A1* | 6/2012 | Choi | H01M 2/1673 429/246 |
| 2012/0148935 A1* | 6/2012 | Lee | H01M 4/8828 429/481 |
| 2014/0087252 A1* | 3/2014 | Hirakawa | H01M 4/0404 429/211 |
| 2014/0101931 A1 | 4/2014 | Lee et al. | |
| 2015/0380706 A1 | 12/2015 | Yu et al. | |
| 2016/0372780 A1* | 12/2016 | Sohn | H01M 4/0404 |

FOREIGN PATENT DOCUMENTS

| | | | | |
|---|---|---|---|---|
| JP | 2014-130742 A | | 7/2014 | |
| JP | 2014-157773 A | | 8/2014 | |
| KR | 2015045786 | * | 4/2015 | ............. H01M 4/04 |
| KR | 10-2015-0080745 A | | 7/2015 | |

* cited by examiner

METHOD FOR MANUFACTURING ELECTRODE

TECHNICAL FIELD

The present disclosure relates to a method for manufacturing an electrode.

The present application claims priority to Korean Patent Application No. 10-2016-0118087 filed on Sep. 13, 2016 and Korean Patent Application No. 10-2017-0112722 filed on Sep. 4, 2017 in the Republic of Korea, the disclosures of which are incorporated herein by reference.

BACKGROUND ART

As technological development and a need for mobile instruments have increased, a demand for secondary batteries as energy sources has increased rapidly. Among such secondary batteries, lithium secondary batteries having high energy density and voltage, long cycle life and a low discharging rate have been commercialized and used widely. A lithium secondary battery includes a positive electrode, a negative electrode and a separator interposed between the positive electrode and the negative electrode, and the electrode, such as a positive electrode or negative electrode, is obtained by applying electrode slurry containing an electrode active material, binder and a solvent to an electrode current collector, and carrying out drying and rolling.

Such a method for manufacturing an electrode is problematic in that the solvent evaporates upwardly from the electrode while the electrode is dried and the polymer binder moves along the direction of solvent evaporation, and thus the distribution of the polymer binder in the electrode active material layer becomes non-uniform. In addition, since the polymer binder is distributed non-uniformly, the adhesion between an electrode collector and an electrode active material layer is decreased, resulting in degradation of the output of a battery.

DISCLOSURE

Technical Problem

The present disclosure is designed to solve the problems of the related art, and therefore the present disclosure is directed to providing a method for manufacturing an electrode which can prevent non-uniform distribution of a polymer binder.

Technical Solution

In one aspect of the present disclosure, there is provided a method for manufacturing an electrode which includes the steps of: (S1) applying electrode slurry containing an electrode active material, a polymer binder and a conductive material dispersed in a solvent to one surface of an electrode current collector; (S2) stacking a polymer film onto the top surface coated with the electrode slurry; (S3) drying the electrode current collector having the polymer film stacked thereon to allow evaporation of the solvent; and (S4) rolling the electrode current collector having the polymer film stacked thereon to obtain an electrode.

Preferably, the method may further include step (S5) of removing the polymer film.

Preferably, the polymer film may be a polymethyl methacrylate, polydimethylsiloxane or a plastic paraffin film.

Preferably, the electrode current collector may be a porous electrode current collector.

Preferably, the pores of the porous electrode current collector may have a diameter of 1-20 μm.

Advantageous Effects

According to the method of the present disclosure, it is possible to solve the problem of non-uniform dispersion of a polymer binder and to improve the adhesion between an electrode current collector and an electrode active material layer.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

DESCRIPTION OF DRAWING NUMERALS

100: Electrode
110: Electrode slurry
111: Polymer binder
112: Electrode active material
120: Electrode current collector
200: Polymer film

BEST MODE

Hereinafter, preferred embodiments of the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
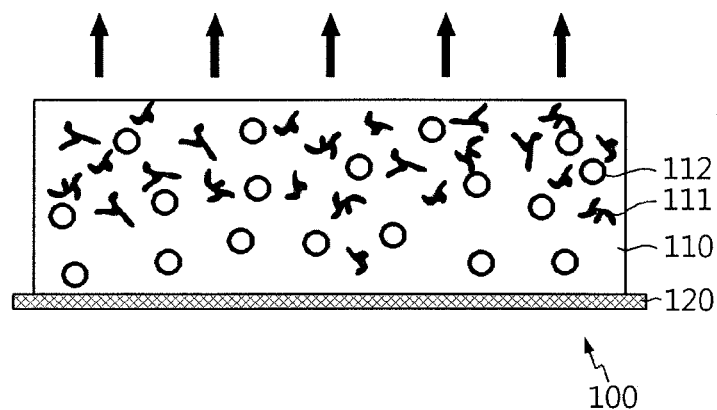
FIG. 1 is a schematic sectional view illustrating a step of drying an electrode according to the related art.

FIG. 1 is a schematic sectional view illustrating a step of drying an electrode according to the related art. Referring to FIG. 1, in the conventional method for manufacturing an electrode, when electrode slurry 110 containing an electrode active material 112, a polymer binder 111 and a solvent is applied to one surface of an electrode current collector 120 and then the slurry is dried, the solvent evaporates upwardly from the electrode 100. Then, the polymer binder 111 moves in the direction of solvent evaporation, thereby causing a problem in that the polymer binder 111 is distributed non-uniformly in the electrode active material layer.

Figure 2:
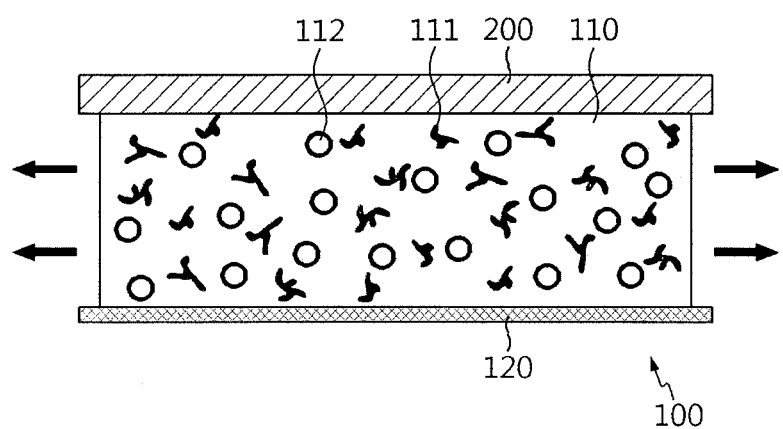
FIG. 2 is a schematic sectional view illustrating a step of drying an electrode according to an embodiment of the present disclosure.

FIG. 2 is a schematic sectional view illustrating a step of drying an electrode according to an embodiment of the present disclosure. Referring to FIG. 2, a polymer film 200 is stacked on the top of the electrode slurry 110 according to the present disclosure. In this manner, it is possible to control the direction of solvent evaporation to the lateral side of the electrode 100 and thus to prevent non-uniform distribution of the polymer binder 111.

The method for manufacturing an electrode according to the present disclosure includes the steps of: (S1) applying electrode slurry containing an electrode active material, a polymer binder and a conductive material dispersed in a solvent to one surface of an electrode current collector; (S2) stacking a polymer film onto the top surface coated with the electrode slurry; (S3) drying the electrode current collector having the polymer film stacked thereon to allow evaporation of the solvent; and (S4) rolling the electrode current collector having the polymer film stacked thereon to obtain an electrode.

Particularly, in step (S1), electrode slurry containing an electrode active material, a polymer binder and a conductive material dispersed in a solvent is applied to one surface of an electrode current collector.

The electrode active material may be a positive electrode active material or a negative electrode active material.

The positive electrode active material may include lithium-containing oxides, preferably lithium-containing transition metal oxides. Particular examples of the lithium-containing transition metal oxides include any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3), or a combination of two or more of them. In addition, the lithium-containing transition metal oxides may be coated with a metal, such as aluminum (Al), or metal oxide. Further, sulfides, selenides and halides may also be used, in addition to the lithium-containing transition metal oxides.

The negative electrode active material is capable of lithium ion intercalation/deintercalation and particular examples thereof include lithium metal, a carbonaceous material, metal compound, and a combination thereof.

Particularly, low crystalline carbon and high crystalline carbon may be used as carbonaceous material. Typical examples of low crystalline carbon include soft carbon and hard carbon. Typical examples of high crystalline carbon include Kish graphite, pyrolytic carbon, mesophase pitch based carbon fibers, meso-carbon microbeads, mesophase pitches, and high-temperature baked carbon, such as petroleum or coal tar pitch-derived cokes.

Particular examples of the metal compound include compounds containing at least one metal element, such as Si, Ge, Sn, Pb, P, Sb, Bi, Al, Ga, In, Ti, Mn, Fe, Co, Ni, Cu, Zn, Ag, Mg, Sr and Ba. Although such metal compounds may be used in any one of the forms, including simple substance, alloy, oxides ($TiO_2$, $SnO_2$, etc.), nitride, sulfide, boride and alloy with lithium, simple substance, oxides and alloy with lithium may have high capacity. Particularly, metal compounds which may contain at least one element selected from Si, Ge and Sn and contain at least one element selected from Si and Sn can provide a battery with higher capacity.

The polymer binder may be any one selected from the group consisting of polyvinylidene fluoride (PVDF), hexafluoropropylene (HFP), polyvinylidene fluoride-co-hexafluoropropylene (PVDF-co-HFP), polyvinylidene fluoride-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile-styrene-butadiene copolymer and polyamide, or a combination of two or more of them.

The solvent may include any one selected from the group consisting of acetone, tetrahydrofuran, methylene chloride, chloroform, dimethyl formamide, N-methyl-2-pyrrolidone (NMP), cyclohexane and water, or a mixture of two or more of them.

The electrode current collector may be a positive electrode current collector or negative electrode current collector.

The positive electrode current collector is not particularly limited, as long as it has high conductivity while not causing any chemical change in a battery. Particular examples of the positive electrode current collector include stainless steel, aluminum, nickel, titanium or baked carbon; aluminum or stainless steel surface-treated with carbon, nickel, titanium or silver; or the like.

The negative electrode current collector is not particularly limited, as long as it has conductivity while not causing any chemical change in a battery. Particular examples of the negative electrode current collector include copper, stainless steel, aluminum, nickel, titanium or baked carbon; copper or stainless steel surface-treated with carbon, nickel, titanium or silver; aluminum-cadmium alloy; or the like.

In step (S2), a polymer film is stacked on the top surface coated with the electrode slurry. A polymer film capable of preventing solvent evaporation is stacked to control the direction of solvent evaporation to the lateral side of the electrode, thereby preventing non-uniform distribution of the polymer binder.

The polymer film is not particularly limited as long as it can prevent solvent evaporation. Particular examples of the polymer film include polymethyl methacrylate, polydimethylsiloxane, plastic paraffin films, or the like. Preferably, a polymethyl methacrylate film may be used. Since the polymer film is removed later, there is no particular limitation in the thickness of the polymer film. Preferably, the polymer film may have a thickness of 100-2000 μm.

In step (S3), the electrode current collector having the polymer film stacked thereon is dried to allow evaporation of the solvent. By virtue of the polymer film, the solvent is removed while it evaporates in the lateral direction of the electrode. Thus, it is possible to prevent the polymer binder from moving toward the top surface of the electrode current collector.

In step (S4), the electrode assembly having the polymer film stacked thereon is rolled to obtain an electrode. After the electrode assembly is subjected to rolling, it is possible to control the porosity and pore ratio of the electrode.

In addition, according to another embodiment of the present disclosure, the method for manufacturing an electrode may further include (S3-2) a step of removing the polymer film, after the drying step.

According to still another embodiment of the present disclosure, the electrode current collector may be a porous electrode current collector. When the electrode current collector has a plurality of pores, the solvent may evaporate through the pores and the polymer binder may be distributed uniformly.

The pores of the porous electrode current collector may have a diameter of 1-20 μm.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example

First, a mixture including 95.6 wt % of a negative electrode active material including artificial graphite mixed with natural graphite at a weight ratio of 90:10, 1.0 wt % of carbon black as a conductive material, 2.3 wt % of polyvinylidene fluoride (PVdF) as a binder and 1.1 wt % of carboxymethyl cellulose (CMC) as a thickener was blended with N-methyl pyrrolidone (NMP) as a solvent to provide negative electrode slurry.

The negative electrode slurry was applied to a copper current collector to a loading amount of 4.0 mAh/cm$^2$, and then a polymer film formed of polymethyl methacrylate is stacked thereon. Then, the slurry was dried in a vacuum oven at 120° C. for 10 hours or more to perform evaporation of NMP solvent.

After that, the negative electrode slurry was rolled by using a roll-type press and the polymer film formed of polymethyl methacrylate was removed to obtain a negative electrode.

Comparative Example

First, a mixture including 95.6 wt % of a negative electrode active material including artificial graphite mixed with natural graphite at a weight ratio of 90:10, 1.0 wt % of carbon black as a conductive material, 2.3 wt % of PVdF as a binder and 1.1 wt % of CMC as a thickener was blended with NMP as a solvent to provide negative electrode slurry.

The negative electrode slurry was applied to a copper current collector to a loading amount of 4.0 mAh/cm$^2$, and then the slurry was dried in a vacuum oven at 120° C. for 10 hours or more to perform evaporation of NMP solvent.

After that, the negative electrode slurry was rolled by using a roll-type to obtain a negative electrode.

Determination of Adhesion Between Negative Electrode Active Material Layer and Current Collector Each of the negative electrodes according to Example and Comparative Example was subjected to a peel-off test to determine the adhesion between each negative electrode active material layer and current collector.

Figure 3:
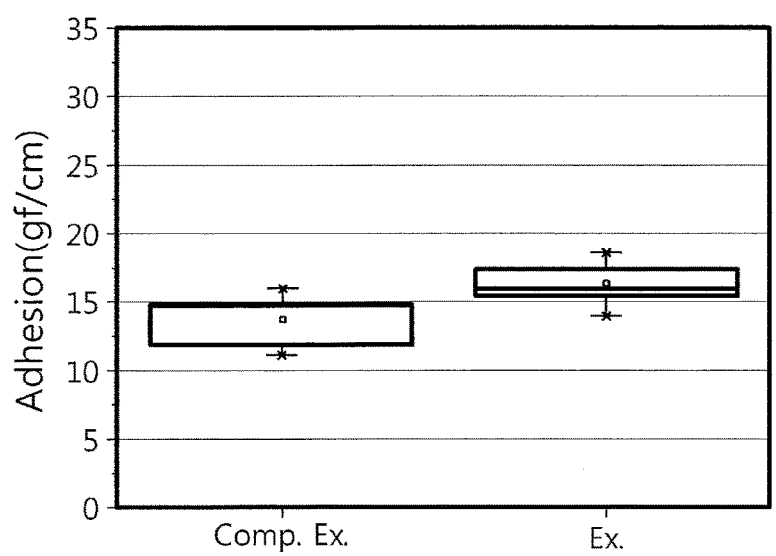
FIG. 3 is a graph illustrating the adhesion between an electrode active material layer and a current collector in each of the electrodes according to Example and Comparative Example.

FIG. 3 is a graph illustrating the adhesion between an electrode active material layer and a current collector in each of the electrodes according to Example and Comparative Example.

Referring to FIG. 3, it can be seen that the electrode according to Example shows higher adhesion as compared to the electrode according to Comparative Example.

The present disclosure has been described in detail with reference to particular embodiments and drawings, but it should be understood that the scope of the present disclosure is not limited thereto. It should be also understood that various changes and modifications within the scope of the disclosure will become apparent to those skilled in the art from this detailed description.

What is claimed is:

1. A method for manufacturing an electrode which comprises the steps of:
   (S1) applying electrode slurry containing an electrode active material, a polymer binder and a conductive material dispersed in a solvent to one surface of an electrode current collector;
   (S2) stacking a polymer film onto the top surface coated with the electrode slurry;
   (S3) drying the electrode current collector having the polymer film stacked thereon to allow evaporation of the solvent wherein the evaporation is to the lateral sides of the electrode;
   (S4) rolling the electrode current collector having the polymer film stacked thereon to obtain an electrode; and
   (S5) removing the polymer film.

2. The method for manufacturing an electrode according to claim 1, wherein the polymer film is a polymethyl methacrylate, polydimethylsiloxane or a plastic paraffin film.

3. The method for manufacturing an electrode according to claim 1, wherein the electrode current collector is a porous electrode current collector.

4. The method for manufacturing an electrode according to claim 3, wherein the pores of the porous electrode current collector have a diameter of 1-20 μm.

5. The method for manufacturing an electrode according to claim 1, wherein the polymer film has a thickness of 100-2000 μm.

* * * * *